Patented July 3, 1951

2,558,932

UNITED STATES PATENT OFFICE 2,558,932

OPACIFIER FOR VITREOUS ENAMELS AND METHOD OF MAKING

William W. Coffeen, Union, N. J., assignor to Metal & Thermit Corporation, New York, N. Y., a corporation of New Jersey No Drawing. Application May 7, 1949,
Serial No. 92,091

4 Claims. (Cl. 106—312)

This invention relates to a preformed opacifier for vitreous enamels and particularly to a mill-added opacifier for enamels for sheet steel. In connection with the latter enamels, tin oxide has for many years been employed as a mill-added opacifier but in more recent times has been replaced to a considerable extent by materials comprising principally titania and antimony combined with an alkaline earth, usually calcium, and fluorine. According to the present invention, preformed opacifiers are provided containing only antimony, calcium and fluorine, thus simplifying the opacifier composition while retaining opacifying power. Also, by eliminating titania, color difficulties are avoided, since titania generally gives rise to yellowish tints in enamels.

The invention comprises a preformed opacifier consisting essentially of 6 to 32% by weight of calcium oxide, 6 to 30% by weight of calcium fluoride, and 54 to 83% by weight of antimony pentoxide, the sum of the calcium oxide and calcium fluoride not exceeding 46% by weight. Compositions within these ranges are believed to contain all three ingredients, namely, calcium, fluorine and antimony, in a united form. This follows from the fact that compositions falling outside of the ranges are shown by X-ray examination to contain a substantial amount of at least one ingredient in free form, or of one ingredient united with only one of the other ingredients. Tests have also shown that the latter compositions invariably have a reduced opacity by comparison with the former. Also excess calcium oxide adversely affects the properties of the wet enamel, i. e. the "set" of the enamel slip. It has further been found that above the upper calcium oxide limit, and below the lower calcium fluoride limit, the compositions tend to have a yellowish tint; while below the lower calcium oxide limit and above the upper calcium fluoride limit, the compositions tend to have a bluish tint. Compositions within the stated ranges have a very pure white color. A preferred range for the opacifier ingredients is 12.2 to 23.6% by weight of calcium oxide, 7.5 to 17.1% by weight of calcium fluoride, and 63.0 to 77.4% by weight of antimony pentoxide.

A preferred method for producing the preformed opacifier is to form an aqueous batch containing calcium carbonate and at least one other calcium compound capable of supplying calcium oxide, a water-soluble fluorine compound, nitric acid, and antimony trioxide. The calcium, fluorine and antimony compounds should of course be present in amounts sufficient to yield in the final product the required quantities of calcium oxide, calcium fluoride, and antimony pentoxide. The aqueous batch is mixed, evaporated to dryness, and the resulting solids are then pulverized and calcined at a temperature of about 1900 to 2300° F., preferably 2000 to 2100° F. The following example may illustrate this procedure:

EXAMPLE 1

The following materials were taken:

| | | |
|---|---|---|
| Water, hot | cc | 3000 |
| Calcium hydroxide, $Ca(OH)_2$ | gms | 392 |
| Nitric acid, $HNO_3$ (40° Bé.) | cc | 380 |
| Antimony trioxide, $Sb_2O_3$ | gms | 1548 |
| Sodium silico-fluoride, $Na_2SiF_6$ | gms | 168 |
| Calcium carbonate, $CaCO_3$ | gms | 788 |

The solid materials were added to the water in a container in the order listed, each addition being followed by vigorous mixing. The batch was then evaporated to dryness and pulverized. The mixing and drying steps can be carried out conveniently in a jacketed kneader-mixer. The resulting powder was calcined in refractory containers to Cone 03 (approx. 2040° F.) in 7 hours. The finished opacifier consisted essentially of: 23.6% by weight of calcium oxide, 8.2% by weight of calcium fluoride, and 68.2% by weight of antimony pentoxide. A slight amount of sodium oxide and silica are also present but do not affect the essential properties of the opacifier.

The opacifiers of the invention may also be prepared by calcining a mixture of calcium carbonate, calcium fluoride and antimony trioxide. The difference between this method and the one just described lies in the fact that the source of fluorine here is an insoluble fluorine compound. Calcium oxide, calcium hydroxide, calcium antimonates and calcium fluoride are other sources for the calcium, while antimony tetroxide, antimony pentoxide and calcium antimonates are other sources for the antimony. The following example illustrates this method:

EXAMPLE 2

The following materials were taken:

| | | |
|---|---|---|
| Water, hot | cc | 3000 |
| Calcium hydroxide, $Ca(OH)_2$ | gms | 195 |
| Nitric acid, $HNO_3$ (40° Bé.) | cc | 381 |
| Antimony trioxide, $Sb_2O_3$ | gms | 1548 |
| Calcium fluoride, $CaF_2$ | gms | 207 |
| Calcium carbonate, $CaCO_3$ | gms | 788 |

As will be apparent, this batch is identical to that of Example 1 as respects the amounts of calcium, fluorine, and antimony. It does involve the omission of a small amount of sodium oxide and silica, but this is not important since other soluble fluorides can be substituted for the sodium silico-fluoride of Example 1. The above batch of materials were mixed, dried, pulverized and calcined in the manner described in Example 1. The resulting opacifier had the following composition: 23.6% by weight of calcium oxide, 8.2% by weight of calcium fluoride, and 68.2% by weight of antimony pentoxide.

As sources for the calcium there may be mentioned, in addition to the compounds noted above, calcium nitrate, calcium antimonate, etc.; fluorine may also be obtained from hydrogen fluoride, hydrogen silicofluoride, magnesium silicofluoride, zinc silicofluoride, etc., all of which are water soluble; and antimony may be additionally supplied as antimony tetroxide, antimony pentoxide, calcium antimonate, sodium antimonate, etc.

The following example demonstrates the performance of the foregoing opacifiers:

EXAMPLE 3

The opacifiers prepared as described in Examples 1 and 2 were each added to two different frits as mill-added opacifiers, one an antimony base frit and the other a zirconium base frit, and enamels were conventionally prepared. Duplicate enamels were also prepared containing a commercial opacifier, identified as opacifier A. These cover enamels were then applied in a normal manner to samples of sheet steel, after which reflectance data was obtained by means of a standard Hunter reflectometer. The data may be summarized as follows, the components of the enamels being reported on a parts by weight basis:

Series I

| Sample No. | O-412 | O-389 | O-298A |
|---|---|---|---|
| Antimony base frit | 100 | 100 | 100 |
| Clay | 7 | 7 | 7 |
| Magnesium Carbonate | 0.25 | 0.25 | 0.25 |
| Opacifier: | | | |
| Example 1 | 3 | | |
| Example 2 | | 3 | |
| Opacifier A | | | 3 |
| Water | 45 | 45 | 45 |
| Reflectance (green) | 74.4 | 73.5 | 72.8 |

Series II

| Sample No. | O-404 | O-400 | O-405 |
|---|---|---|---|
| Zircon base frit | 100 | 100 | 100 |
| Clay | 7 | 7 | 7 |
| $NaNO_2$ | 0.25 | 0.25 | 0.25 |
| $K_2CO_3$ | 0.15 | 0.15 | 0.15 |
| Opacifier: | | | |
| Example 1 | 2 | | |
| Example 2 | | 2 | |
| Opacifier A | | | 2 |
| Water | 45 | 45 | 45 |
| Reflectance (green) | 77.7 | 77.3 | 77.0 |

It will be apparent from the data of Example 3 that the opacifiers provided by the invention are at least competitive with present commercial products.

In addition to their advantages as mill-added opacifiers in sheet steel enamels, the present opacifiers, as illustrated in Example 4, are also suitable for use in enamel frits in which case they are incorporated directly in the batch of raw ingredients from which the frit is prepared. They not only provide good opacity but also improve the fluidity of the frit during smelting.

EXAMPLE 4

Two conventional cast-iron enamel frits were prepared according to commercial formulae, one of the acid-resisting and the other of the non-acid-resisting type. In one case, to each type of frit, as a part of the raw batch, sodium antimonate, representing the usual commercial opacifier (16.7% $Na_2O$ and 83.3% $Sb_2O_5$) was added. In a second case, a preformed opacifier prepared according to the invention was added to each type of frit, the latter opacifier having the following weight percentage composition: calcium oxide 23.6%, calcium fluoride 8.2%, and antimony pentoxide 68.2%. A slight amount of magnesium oxide and silica were also present, but these are not considered to have any noticeable effect on opacifying power. Equal amounts of sodium antimonate and preformed opacifier were taken for these frits. All enamels were then applied to cast iron by the dry process and tested as to reflectance, and, in the case of the acid resistant enamel, as to acid resistance. The data follows:

| | Reflectance (green) | Acid Resistance |
|---|---|---|
| ACID RESISTANT ENAMELS | | |
| Frit containing: | | |
| Sodium Antimonate | 82.8 | AA |
| Preformed Opacifier | 83.2 | AA |
| NON-ACID RESISTANT ENAMELS | | |
| Frit containing: | | |
| Sodium Antimonate | 80.4 | |
| Preformed Opacifier | 81.1 | |

EXAMPLE 5

Other opacifiers were prepared, some falling within and some without the broader ranges stated above. The compositions of these opacifiers, in per cent by weight, are as follows:

| Sample No. | 228 | 230 | 216 | 67 | 233 | 235 |
|---|---|---|---|---|---|---|
| Calcium oxide | 38.2 | 9.2 | 30.2 | 0 | 29.5 | 10.5 |
| Calcium fluoride | 6.6 | 38.5 | 0 | 28.9 | 13.7 | 29.1 |
| Antimony pentoxide | 55.2 | 52.4 | 69.8 | 71.1 | 56.8 | 60.4 |

Opacifier No. 228 had a light yellow color, and when used as a mill-added opacifier, it destroyed the "set" of the enamel slip. X-ray examination of No. 230 revealed the presence of substantial amounts of free calcium fluoride, which acts as a diluent and thus reduces the opacifying power. No. 216 was also a light yellow product. It had practically no opacifying value as a mill-added opacifier and imparted a highly objectionable yellow color to frits. X-ray examinations showed that No. 67 contained a substantial amount of free calcium fluoride. The product was blue-gray in color and had no opacifying power either as a mill-added or a frit opacifier. Nos. 233 and 235 were both good mill-added opacifiers, the latter on X-ray examination showing only a very small amount of free calcium fluoride.

While the invention has been described in connection with more or less specific embodiments thereof, it will be understood that it is capable of obvious variations without departing from its scope.

In the light of the foregoing description, the following is claimed:

1. A preformed opacifier for a vitreous enamel consisting of 6 to 32% by weight of calcium oxide, 6 to 30% by weight of calcium fluoride, and 54 to 83% by weight of antimony pentoxide, the sum of the calcium oxide and calcium fluoride not to exceed 46% by weight.

2. A preformed opacifier for a vitreous enamel consisting of 12.2 to 23.6% by weight of calcium oxide, 7.5 to 17.1% by weight of calcium fluoride, and 63.0 to 77.4% by weight of antimony pentoxide, the sum of the calcium oxide and calcium fluoride not to exceed 37.0% by weight.

3. A preformed opacifier for a vitreous enamel consisting of about 24% by weight of calcium oxide, about 8% by weight of calcium fluoride, and about 68% by weight of antimony pentoxide.

4. A method for producing the opacifier of claim 1 which comprises adding to water calcium carbonate and at least one other calcium compound capable of supplying calcium oxide, nitric acid, antimony trioxide, and a water-soluble fluorine compound, to form a batch, the calcium, flourine, and antimony compounds being present in amount to yield a final product containing calcium oxide, calcium fluoride, and antimony pentoxide in the quantities set forth in claim 1, mixing the foregoing batch, evaporating the same to dryness, pulverizing the resulting solids, and calcining the powder at about 1900 to 2300° F.

WILLIAM W. COFFEEN.

REFERENCES CITED

The following references are of record in the file of this patent:

UNITED STATES PATENTS

| Number | Name | Date |
|---|---|---|
| 932,839 | Weimer | Aug. 31, 1909 |
| 2,189,148 | McIntyre et al. | Feb. 6, 1940 |
| 2,199,794 | Harshaw et al. | May 7, 1940 |
| 2,306,356 | Harbert et al. | Dec. 22, 1942 |
| 2,306,357 | Harbert et al. | Dec. 22, 1942 |
| 2,468,711 | King et al. | Apr. 26, 1949 |

FOREIGN PATENTS

| Number | Country | Date |
|---|---|---|
| 14,632 | Great Britain | 1913 |